Sept. 13, 1949.   R. E. MEAGHER ET AL   2,482,020
SELF-SYNCHRONOUS MOTOR SYSTEM
Filed Sept. 25, 1944
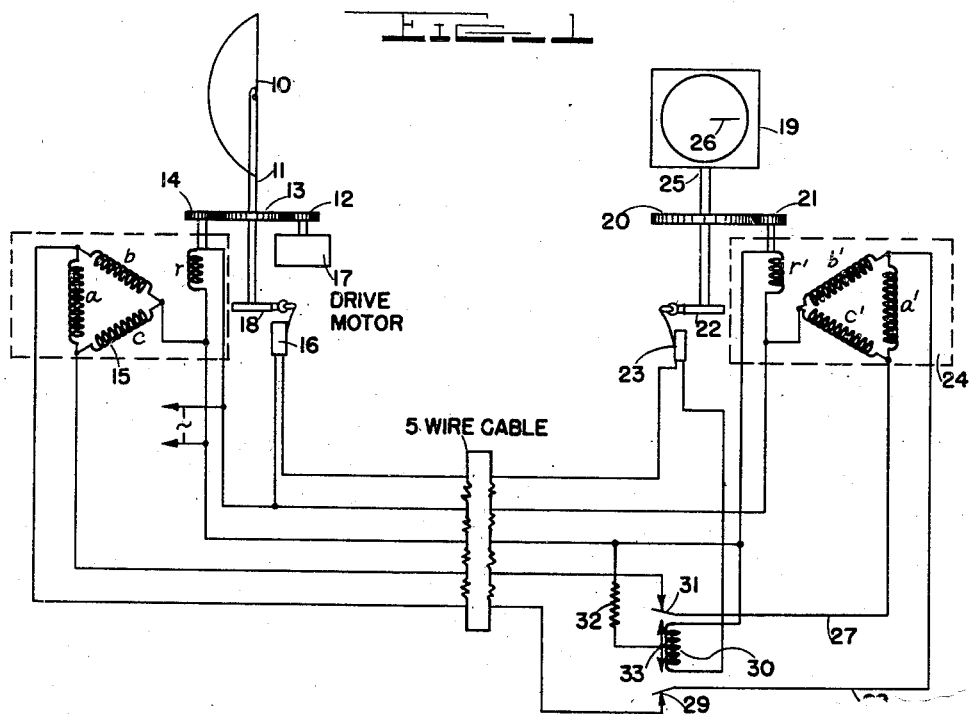
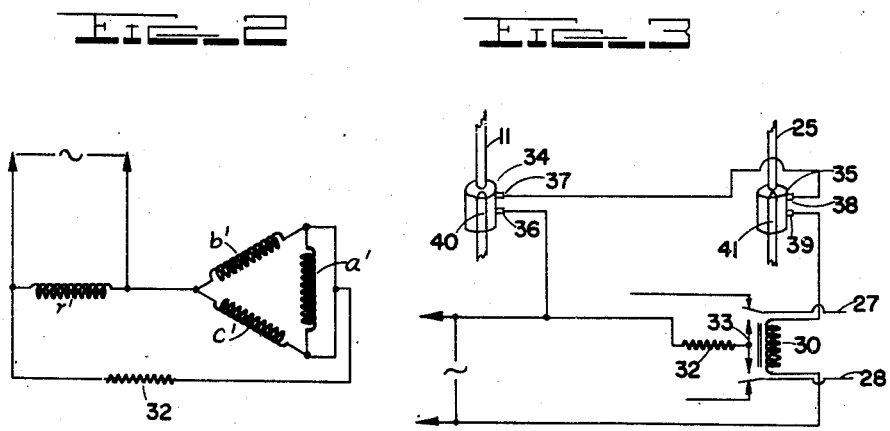
Inventors
RALPH. E. MEAGHER
MAYNARD D. MC FARLANE
By *W Glenn Jones*
Attorney Patented Sept. 13, 1949

2,482,020

UNITED STATES PATENT OFFICE 2,482,020

SELF-SYNCHRONOUS MOTOR SYSTEM

Ralph E. Meagher, Watertown, Mass., and Maynard D. McFarlane, Los Angeles, Calif., assignors, by mesne assignments, to the United States of America, as represented by the Secretary of the Navy Application September 25, 1944, Serial No. 555,704

14 Claims. (Cl. 318—24)

1

This invention relates to a method of and a means for maintaining absolute synchronism between a driving member and a driven member coupled together by a self-synchronous motor system.

In apparatus wherein it is desired to synchronize a driving member with a driven member, synchronous motors are often used whenever the two are remotely separated and therefore cannot be conveniently mechanically interconnected. For example, such a system is used to a great advantage in the "Plan position indicator system" of radio echo detection apparatus wherein it is of utmost importance to maintain absolute phase correspondence between the rotating antenna and the radial sweep line on the cathode ray tube indicator in order that the exact bearing of remote objects may be represented by the angular position of the radial sweep line.

It is an object of this invention to provide a system of self synchronous motors for obtaining absolute synchronization between a driving member and a driven member.

It is another object of this invention to provide a system of self synchronous motors for synchronizing a driving member and a driven member having a means for reestablishing phase correspondence between said members whenever the phase difference between the two exceeds a predetermined degree.

It is another object of this invention to provide a system of self synchronous motors for synchronizing a driving member with a driven member having a means for abruptly and automatically stopping said driven member whenever the phase difference between said members exceeds a predetermined degree and automatically starting said driven member when the proper phase relation between the two has been restored.

Other objects and features of the present invention will become apparent upon a careful consideration of the following detailed description when taken together with the accompanying drawings.

Fig. 1 is a wiring diagram of one embodiment of the invention, Fig. 2 is a schematic wiring diagram of the driven synchronous motor when held in a locked in position, and Fig. 3 is a schematic diagram showing in part one possible modification of the invention.

Reference is now had to Fig. 1 wherein there is shown one embodiment of the invention which is adapted to produce synchronous rotation between the antenna 10 and the radial sweep line 26 on the cathode ray tube indicator 19. In this

2 embodiment single phase synchronous motors are used; that is, those motors having a single phase rotor winding with a delta connected stator winding, but it is to be understood, however, that 2 or 3 phase motors can also be used if desired. The motors which will hereinafter be referred to as "synchro motors" are connected in general in the usual manner having the stator windings of the driving motor 15 connected to the corresponding stator windings of the driven motor 24 as are the respective rotor windings. The latter in turn are excited by a common source of A. C. voltage so that movement of the rotor of the driving motor 15 by the power operated motor 17 will induce an unbalanced voltage in the two sets of stator windings which in turn provides a driving torque to the rotor of the driven motor 24 to force its rotor to move synchronously with the rotor of 15. The angle of lag between the driven motor 24 and the driving motor 15 is proportional to the load on the driven motor and varies for different positions of its rotor due to the difference in frictional resistance at different points in the rotor rotation. To overcome this operational defect geared synchronous motors are used, comprising the driving synchro 15 or generator as it is sometimes known coupled to the antenna 10 through gears 13 and 14 and the driven synchro 24 coupled to the magnetic beam deflecting yoke for example, of the cathode ray tube indicator 19 through gears 20 and 21.

It has been found that for best operational characteristics the speed of the synchros should be approximately 200 R. P. M. with the antenna and sweep line speed set at about 20 R. P. M. Consequently, there will appear a 10:1 gear reduction between the antenna drive gear 13 and the driving synchro gear 14 and a corresponding gear reduction between the magnetic deflecting yoke gear 20 and the driven synchro gear 21. There will thus exist a 10:1 reduction in torque required by the driven synchro 24 together with a similar reduction in phase difference between the angular positions of the antenna and the radial sweep line for a given displacement between the rotors of the respective synchros. That is to say, for example, a 20° phase difference between the rotors of the synchros will be reflected as a 2° phase difference between the angular positions of the antenna and sweep line. Thus theoretically a 100:1 increase in accuracy is obtained over a direct coupled synchro system, but a 30:1 increase is more frequently realized in actual practice.

Obviously ten revolutions of the synchro rotors corresponds to one revolution of the antenna or radial sweep line. Consequently angular correspondence may exist between the synchro rotors while a 36°, 72°, 108° or etc. phase difference may exist between the angular position of radial sweep and the antenna. Such angular discrepancies are here remedied through the use of a cam operated switch and relay arrangement for restoring angular correspondence between the antenna 10 and the sweep line 26 whenever the difference between the two exceeds a predetermined degree. This feature includes switches 16 and 23 serially connected together with the double acting relay 30 across the A. C. excited rotor windings $r$ and $r'$ of the synchro. The stator winding $a$ of the driving synchro is then connected to the corresponding stator winding $a'$ of the driven synchro 24 through the contacts 29 and 31 of the relay 30. This connection is sustained as long as relay 30 is de-energized, i. e., as long as one switch 16 or the other 23 is held open, but when both switches are closed relay 30 is energized and contacts 29 and 31 are brought to bear on the shorting bar 33 to thereby short out the winding $a'$ through leads 27 and 28. Simultaneously therewith resistance 32 is connected in series with winding $b'$ and $c'$ across the rotor winding $r'$. The equivalent circuit for the driven synchro during this period is shown in Figure 2. In this case the voltage developed across winding $a'$ is zero while that developed across winding $b'$ and $c'$ is equal to each other and to the rotor winding minus the IR drop through the resistance 32. This condition is known to simulate a locked in stationary synchro and provides a regenerative braking torque to the rotor of the driven synchro in a manner to be described in detail hereinafter.

Switches 16 and 23 are of a type now known to the art which are adapted to be actuated by suitable cams such as 18 and 22, which are in turn carried respectively by the antenna shaft 11 and magnetic yoke shaft 25. In operation cam 18 is designed with a cam surface which normally sustains the contacts of switch 16 closed for all except 16 to 18 degrees of a revolution, while cam 22 is designed with a cam surface which sustains the contacts of switch 23 open for all except 12 to 14 degrees of a revolution. The cam, switch and rotor of one synchro is then initially adjusted to lie in angular correspondence with the corresponding elements of the other synchro, while the rotors are positioned so as to induce equal voltages in the $b$ and $c$ windings and zero voltage in the $a$ winding of each synchro during the time that the switches are in contact with the midpoints of the cam surfaces of the respective cams. Thus when the proper phase correspondence is observed between the antenna 10 and the sweep line 26 one switch or the other will always be open, and therefore relay 30 maintained de-energized.

If the phase difference between the mid-point of the cams should exceed 1½ degrees then there will occur an instant during which both switches will be closed to thus energize the relay 30 which in turn produces a simulated locked in condition for the synchro 24 as shown in Fig. 2, i. e. it produces the electrical condition that should occur were the respective rotors lying in angular correspondence at that instant. Now then since the driven synchro rotor $r'$ is angularly disposed from its position as simulated by the operation of the relay 30, the rotor $r'$ will induce an unbalanced voltage in the stator windings to thus produce a circulating current therein which reacts upon the excitation flux to thus provide a regenerative braking torque to the rotor. It has been found that this braking action is so rapid that cam 22 will in most instances be halted in contact with switch 23 to thereby maintain relay 30 energized since cam 18 normally holds switch 16 closed and cam 22 holds switch 23 closed when in contact with the cam surface thereof. In this condition the rotor of synchro 24 will be held stationary since the voltages developed in the stator windings thereof will be those caused by the circuit connection shown in Fig. 2 until the next cycle of rotation when cam 18 will actuate switch 16 to break the circuit to the relay 30 to thus impart a rotating torque to rotor $r'$ and hence permit the sweep line 26 to start rotating in phase correspondence with the antenna 10.

An equally effective and simple means for operating the relay 30 in response to excessive phase differences between the orientation of the sweep line and antenna is shown in Fig. 3, comprising a pair of segmented rings and suitable brush members as a substitute for the cam operated switches. Here the bearing supports for the antenna and magnetic yoke shafts, the brush armatures and other elements are omitted as they were in Fig. 1 in order to simplify the illustration. Each shaft 11 and 25 carries a segmented ring 34 and 35 which in turn engage a respective pair of brushes 36, 37 and 38, 39. The brushes of each pair are placed one over the other in a mutual plane which intersects the longitudinal axis of the segmented ring. In this case the segmented ring 34 carried by the antenna shaft consists primarily of conducting material having a 16 to 18 degree segment 40 of insulating material while ring 35 consists primarily of insulating material having a 12 to 14 degree segment 41 of conducting material. The insulating segment 40 of ring 34 is then initially adjusted to phase correspondence with the conducting segment 41 of ring 35 while the respective rotors and brushes are arranged similar to that described in connection with Fig. 1. The relay 30 is then serially connected together with each pair of brushes across the A. C. excited rotors. Thus as is the case before, the circuit to the relay 30 will be incomplete as long as phase correspondence between the antenna and the sweep line is held to within 1 and ½ degrees. If desired the brushes could be carried by their respective rotating shafts with the segmented rings held stationary and arranged so that the brushes rotate in electrical contact about them.

Although we have shown and described this invention as a means for maintaining phase correspondence between a rotating antenna and radial sweep line on a cathode ray tube it must be understood that the same may be applied to any suitable synchro motor coupling system. Therefore this invention is not to be restricted except insofar as is necessitated by the prior art and the spirit of the appended claims.

What is claimed is:

1. A system of self synchronous motors for synchronizing a driving member with a driven member, comprising a pair of interconnected synchro motors having delta connected stator windings coupling said driving and driven members together, a means for automatically shorting one stator winding of the driven synchro thereby abruptly stopping said driven member whenever the phase difference between said driving and driven members exceeds a predetermined degree, and means for automatically starting said driven member when phase correspondence is re-established between said members.

2. A system of self synchronous motors for synchronizing a driving member and a driven member, comprising a pair of synchro motors having delta connected stator windings and single phase rotor windings, a means for automatically shorting one stator winding of the driven synchro and inducing equal voltages in the other two stator windings of said synchro thereby stopping said driven member, said means rendered operative whenever the phase difference between said driving member and said driven member exceeds a predetermined degree, and means for starting said driven member when phase correspondence between said driving member and driven member is re-established.

3. A system of self synchronous motors for synchronizing a driving member and a driven member, comprising a pair of synchro motors having delta connected stator windings and single phase rotor windings, a cam coupled to each of said driving and driven members, said cams being correspondingly oriented, a means for automatically shorting one of said stator windings of the driven selsyn and inducing equal voltages in the other two stator windings of said synchro thereby stopping said driven member, said means rendered operative whenever the phase difference between said cams exceeds a predetermined degree, and a means for starting said driven member when phase correspondence between said cams is re-established.

4. A system of self synchronous motors for synchronizing a driving member and a driven member, comprising a pair of interconnected synchro motors having delta connected stator windings coupling said driving and said driven members together, a relay, a means for energizing said relay whenever the phase difference between said driven member and said driving member exceeds a predetermined degree, means associated with said relay for shorting one stator winding of the driven synchro thereby stopping said driven member, said last mentioned means rendered operative only when said relay is energized, and means for de-energizing said relay when phase correspondence between said driving and driven members is re-established.

5. A system of self synchronous motors for synchronizing a driving member and a driven member, comprising a pair of interconnected synchro motors having delta connected stator windings coupling said driving member and said driven member together, a relay, a cam coupled to each of said driving and said driven members, said cams being correspondingly oriented, a means for energizing said relay whenever the phase difference between said cams exceed a predetermined degree, and a means associated with said relay for shorting one stator winding of the driven synchro thereby stopping said driven member whenever said relay is energized.

6. A system of self synchronous motors for synchronizing a driving member and a driven member, comprising a pair of interconnected synchro motors coupling said driving member and said driven member together and having delta connected stator windings, a relay, a means for energizing said relay whenever the phase difference between said driving member and said driven member exceeds a predetermined degree, a means associated with said relay for shorting one of said stator windings of said driven synchro and inducing equal voltages in the other two stator winding of said synchro thereby stopping said driven member, said last mentioned means rendered operative only when said relay is energized.

7. A system of self synchronous motors for synchronizing a driving member and a driven member, comprising a pair of interconnected synchro motors coupling said driving member and said driven member together, and having delta connected stator windings, a relay, a cam coupled to each of said driving and driven members, said cams being correspondingly oriented, a means coupled to said cams for energizing said relay whenever the phase difference between said cams exceeds a predetermined degree, a means associated with said relay for shorting one secondary winding of said driven synchro and inducing equal voltage in the other two secondary windings of said synchro thereby stopping said driven member, said last mentioned means rendered operative only when said relay is energized.

8. A system of self synchronous motors for synchronizing a driving member and a driven member, comprising a pair of synchro motors having delta connected stator windings coupling said driven member and said driving member together, a cam coupled to each of said driving and driven members, said cams being correspondingly oriented, a pair of serially connected switches each being operated by a separate one of said cams, one of said cams normally sustaining one of said switches closed for all but a few degrees per revolution and the other of said cams normally sustaining the other said switch open for shorting one stator winding of the driven synchro thereby all but a few degrees per revolution, a means for stopping said driven member, said last mentioned means being connected in series with said switches and rendered operative whenever the phase between said cams exceeds a predetermined degree.

9. A system of self synchronous motors for synchronizing a driving member and a driven member, comprising a pair of synchro motors having delta connected stator windings coupling said driving and said driven members together, a cam coupled to each of said driving and driven members, said cams being correspondingly oriented, a pair of serially connected switches each being operated by a separated one of said cams, one of said cams normally sustaining one of said switches open for all but a few degrees per revolution the other of said cams sustaining the other of said switches closed for all but a few degrees per revolution, a relay connected in series with said switches, said relay being energized whenever the phase difference between said cams exceeds a predetermined degree, and means associated with said relay for shorting one stator winding of the driven synchro thereby stopping said driven member.

10. A system of self synchronous motors for synchronizing a driving member and a driven member, comprising a pair of synchro motors coupling said driving and said driven members together and having delta connected stator windings and single phase rotor windings, a cam coupled to each of said driving and driven members, said cams being correspondingly oriented, a pair of serially connected switches each being operated by separate one of said cams, one of said cams normally sustaining one of said switches closed for all but a few degrees per revolution, the other said cam normally sustaining the other said switch open for all but a few degrees per revolution, a relay connected in series with said switches, means energizing said relay whenever the phase difference between said cams exceed a predetermined degree, and a means associated with said relay for shorting one of said stator windings of the driven synchro and inducing equal voltage in the other two stator windings of said synchro thereby stopping said driven member, said last mentioned means rendered operative only when said relay is enlarged.

11. A system of self synchronous motors for synchronizing a driving member and a driven member, comprising a pair of synchro motors coupling said driving and said driven members together and having delta connected stator windings and single phase rotor windings, a segmented ring coupled to each of said driving and driven member and adapted to rotate therewith, one of said rings consisting primarily of conducting material having a small segment of insulating material, other said ring consisting primarily of insulating material having a segment of conducting material which is smaller than the segment on said one ring, a pair of brushes contacting each of said rings and being aligned one over the other in the same plane, the segments of each of said rings and their respective brushes being disposed in angular correspondence with respect to each other, a relay connected in series with said brushes, means energizing said relay whenever the phase difference between said segments or said rings exceeds a predetermined degree, and means associated with said relay for shorting one of said stator windings of the driven synchro and developing equal voltages across the other two stator windings of said synchro thereby stopping said driven member, said last mentioned means rendered operative only when said relay is energized.

12. A system of self-synchronous motors for synchronizing a driving member and a driven member, comprising a pair of interconnected synchro motors having delta connected stator windings coupling said driving and driven members together, first and second correspondingly oriented cams respectively coupled to said driving and driven members, means for automatically shorting one stator winding of the driven synchro thereby stopping said driven member, said means rendered operative whenever the phase difference between said first and second cams exceeds a predetermined degree, and means for automatically starting said driven member when phase correspondence is re-established between said cams.

13. A system of self synchronous motors for synchronizing a driving member and a driven member, comprising a pair of synchro motors coupling said driving and said driven members together and having delta connected stator windings and single phase rotor windings, a cam coupled to each of said driving and driven members, said cams being correspondingly oriented, a pair of serially connected switches each being operated by separate one of said cams, one of said cams normally sustaining one of said switches closed for all but a few degrees per revolution, the other said cam normally sustaining the other said switch open for all but a few degrees per revolution, a relay connected in series with said switches, means energizing said relay whenever the phase difference between said cams exceeds a predetermined degree, and a means associated with said relay for shorting one of said stator windings of the driven synchro and inducing equal voltage in the other two stator windings of said synchro thereby stopping said driven member, said last mentioned means rendered operative only when said relay is energized, and means for automatically starting said driven member when phase correspondence is re-established between said cams.

14. A system of self-synchronous motors for synchronizing a driving member and a driven member, comprising a pair of interconnected synchro motors having delta connected stator windings coupling said driving and driven members together, first and second segmented rings respectively coupled to said driving and driven members, said first ring consisting primarily of conducting material and having a small segment of insulating material, said second ring consisting primarily of insulating material and having a segment of conducting material which is smaller than the insulating segment of said first ring, first and second pairs of brushes respectively contacting said first and second rings, said segments of said first and second rings and said first and second pairs of brushes being respectively disposed in angular correspondence, means serially connected with said brushes for shorting one stator winding of the driven synchro motor whenever the phase difference between said segments exceeds a predetermined degree, and means for automatically starting said driven synchro motor when phase correspondence is re-established between said segments.

RALPH E. MEAGHER.
MAYNARD D. McFARLANE.

REFERENCES CITED

The following references are of record in the file of this patent:

UNITED STATES PATENTS

| Number | Name | Date |
|---|---|---|
| 2,239,101 | Jeffers | Apr. 22, 1941 |

Certificate of Correction

Patent No. 2,482,020 September 13, 1949

RALPH E. MEAGHER ET AL.

It is hereby certified that error appears in the printed specification of the above numbered patent requiring correction as follows:

Column 7, line 8, for the word "enlarged" read *energized*;

and that the said Letters Patent should be read with this correction therein that the same may conform to the record of the case in the Patent Office.

Signed and sealed this 14th day of February, A. D. 1950.

[SEAL]

THOMAS F. MURPHY,
*Assistant Commissioner of Patents.*